Aug. 29, 1933.    H. MUELLER    1,924,621
CAVITATION FREE FLUID JOINT
Filed March 6, 1933    2 Sheets-Sheet 1

INVENTOR
HANS MUELLER
BY
ATTORNEY

Aug. 29, 1933.   H. MUELLER   1,924,621
CAVITATION FREE FLUID JOINT
Filed March 6, 1933   2 Sheets-Sheet 2

INVENTOR
HANS MUELLER
BY
ATTORNEY

Patented Aug. 29, 1933

1,924,621

UNITED STATES PATENT OFFICE 1,924,621

CAVITATION FREE FLUID JOINT

Hans Mueller, Heidenheim-on-the-Brenz, Wurttemburg, Germany, assignor to J. M. Voith, Heidenheim-on-the-Brenz, Germany, a copartnership composed of Walther Voith, HerMann Voith, and Hanns Voith Application March 6, 1933, Serial No. 659,792, and in Germany August 20, 1931

15 Claims. (Cl. 253—117)

This invention relates to improvements in the construction of rotary machines which are capable of either propelling or of being propelled by fluid, such for instance as pumps, hydraulic turbines and the like, and more particularly to improvements in means for preventing cavitation at the fluid joints of such machines.

An object of the invention is to provide an improved construction of the surfaces which connect two fields of different pressures in rotary machines and the like, so as to prevent cavitation and the pitting or corroding caused thereby.

Another object of the invention is to provide an improved fluid joint for pumps, hydraulic turbines, and the like, in which the flow of the fluid through the joint is steadily accelerated toward the outlet.

Another object of the invention is to provide a cavitation free fluid joint between the outer edges of the blades of an impeller and the wall of the surrounding casing.

Another object of the invention is to provide an improved form of blade for impellers or the like, in which the fluid joint formed between the outer edge of the blades and the casing which encloses the impeller, is so formed as to prevent the formation of local whirls or eddies, and the resultant formation of low pressure in the fluid passing through the joint from the pressure side to the suction side of the impeller.

Another object of the invention is to provide an improved impeller of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings:—

It is well known that fluid flowing through the conventional sharp cornered, parallel walled fluid joints which connect two fields of different pressures is apt to cause cavitation. The cavitation is due to the upper part of the jet being contracted, and consequently the pressure of the fluid is lowered to the vapor point.

It has been found that cavitation frequently occurs at the fluid joints of rotary machines, such as pumps, turbines, and the like, and this cavitation results in extensive pitting or corroding of the metal. The portions of the pumps and the turbines usually affected by cavitation are the impellers, and the pitting or corroding occurs in a restricted or comparatively narrow zone on the under or suction side of the impeller blades and also on the outer edges thereof.

It has been found that if the contour of the fluid joint between fields of different pressures is constructed so that the flow of the fluid through the joint is steadily accelerated toward the outlet, cavitation, due to departure of the jet from the walls of the joint, will not occur.

Since cavitation occurs to some extent in pumps and hydraulic turbines, I have, in the instant case, described the application of my invention to machines of this type, although it will be understood that my invention is also applicable to machines or devices of other types in which cavitation may be found to occur.

Figure 1:
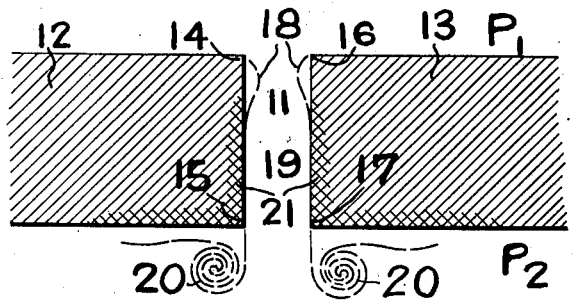
Figure 1 is a view in section, illustrating diagrammatically a conventional fluid joint in which cavitation phenomena may be expected.

Referring to Fig. 1, the fluid joint illustrated consists of a passage 11, defined by spaced parallel walls 12 and 13. Sharp corners 14, 15 are formed at each end of the wall 12, and similarly shaped corners 16, 17 are formed at each end of the wall 13.

$P_1$ and $P_2$, respectively, designate the pressure on the pressure and suction sides of the fluid joint.

In the conventional design of fluid joint shown in Fig. 1, a contraction of the fluid occurs at the inlet at the pressure side, as indicated by the broken lines 18.

Directly below the zone of the fluid joint in which the fluid contracts, there is a mixing zone 19.

On account of the partial regaining of energy in the mixing zone 19, a statical pressure will occur in the contracted section of the fluid jet, as indicated by the lines 18, Fig. 1. This statical pressure is less than the pressure $P_2$ on the vacuum side of the fluid joint.

When the absolute statical pressure $P_2$ is small enough relative to the difference between the statical pressure $P_1-P_2$, the average pressure in the contracted jet decreases to the vapor pressure. On the other hand when the absolute statical pressure $P_2$ is high relative to the pressure difference $P_1-P_2$, while high rotation velocities are created in the local whirl centers of the mixing zone 19, the pressure in these local whirl centers decreases to the vapor pressure of the fluid. In this way cavitation occurs in the narrowest section of the contracted fluid jet.

In a similar manner cavitation phenomena will also occur at the outlet edge or vacuum side of the fluid joint. This cavitation is due to the formation of eddies or whirls created by the rolling up of the separating plane between fields of different velocities, as indicated in Fig. 1 by the broken lines 20.

Due to the well known harmful action of the cavitation, the surfaces of the fluid joint indicated by the double section lines 21, Fig. 1, will easily corrode or be pitted.

Figure 2:
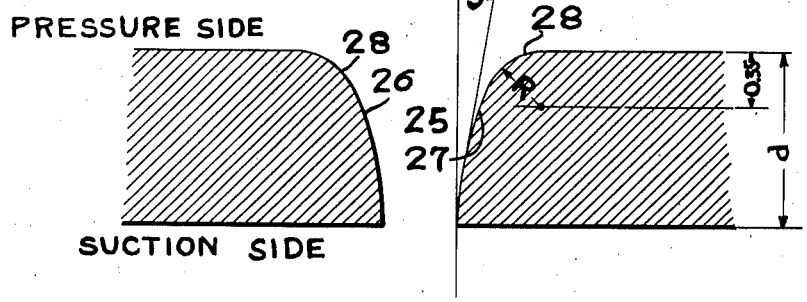
Fig. 2 is a view similar to Fig. 1 of one form of cavitation free fluid joint constructed according to the present invention.

Referring to Fig. 2, the fluid joint is shown as comprising a passage 25 between two side walls 26 and 27. The side walls 26 and 27 are so shaped that the contour of the fluid joint 25 steadily changes in the direction of the flow from the pressure side to the suction side.

The fluid joint (Fig. 2) is made tapered, being wider at the inlet than at the outlet, and the inlet corners 28 are slightly rounded off.

Obviously, the contour of the fluid joint, as defined by the side walls 26 and 27, can vary to suit varying conditions. However, it has been determined that the shape or taper of the side walls 26 and 27 relative to the vertical direction of flow should not be less than 3°, and that the radius of curvature at the inlet side of the fluid joint should not be less than $0.35 \times$ "$d$", "$d$" representing the vertical distance between the pressure side and the suction side of the fluid joint, as indicated at the right in Fig. 2.

By constructing the fluid joint with the tapered walls 26, 27 and the curved inlet corners 28, as shown in Fig. 2, all particles of the fluid jet inside of the joint are accelerated steadily in such a way that at no place will cavitation occur due to departure of the fluid from the side walls of the fluid joint. Furthermore, assuming that the side wall 27 rotates relative to the side wall 26, on account of the high velocities in the flow of the fluid through the tapered fluid joint 25, the decrease in pressure along the side walls 26, 27 created by centrifugal forces resulting from the rotation of the side wall 27, will not be accentuated, and therefore the fluid jet will not depart from the side walls of the fluid joint and cause cavitation.

It will therefore be apparent that if the fluid joint is so constructed as to permit full flowing contact of the fluid jet with the side walls of the joint, a cavitation free fluid joint will be had.

Figure 3:
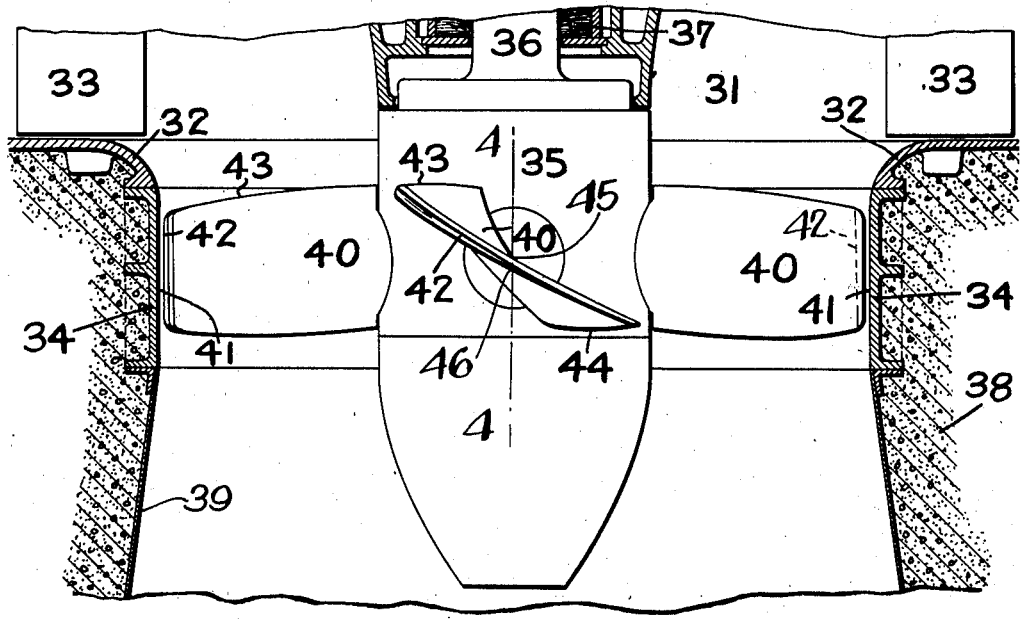
Fig. 3 is a view partly in section of a portion of a hydraulic turbine, showing the relation of the runner to the casing.
Figure 4:
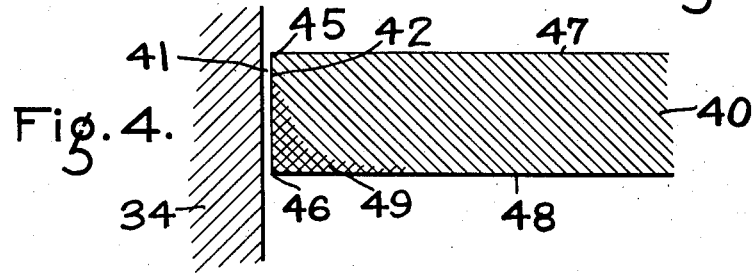
Fig. 4 is an enlarged section taken on the line 4—4 of Fig. 3, showing the usual construction of the fluid joint between the outer edge of the runner blades and the adjacent surface of the casing.
Figure 5:
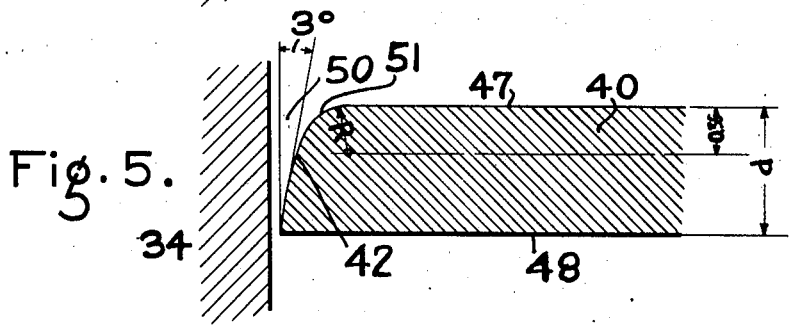
Fig. 5 is a view similar to Fig. 4, showing the outer edge of the runner blades constructed according to the present invention so as to provide a cavitation free fluid joint.

A practical application of the invention in connection with a hydraulic turbine is illustrated in Figs. 3–5.

As shown in Fig. 3 the turbine 31 comprises a casing 32 which forms a peripheral water inlet in which are mounted an annular series of wicket gates or guide vanes 33, only a portion of which is shown. The lower portion 34 of the turbine casing forms an axially directed chamber in which the runner 35 operates.

The hub of the runner 35 is fixed to the lower end of a shaft 36 which is journalled in a suitable bearing 37 mounted in the turbine casing.

Any suitable type of setting may be used for the turbine installation, a concrete setting 38 being shown in the present instance. The portion of the setting below the turbine forms a draft tube 39 into which the water is discharged from the runner.

As shown, the turbine is of the adjustable blade type, and a suitable number of blades 40 are rotatably supported in the hub of the runner 35 and project radially therefrom. A fluid joint 41 is formed between the outer edge 42 of each blade 40 and the wall of the casing 34 (see also Fig. 4). Each blade 40 has an entrance edge 43 and a discharge edge 44, both of which edges extend from the hub of the runner 35 outwardly to the outer edge 42.

Heretofore, in the construction of impellers or runners for hydraulic turbines, it has been customary to form the outer edge 42 of the blades flat or parallel to the wall of the turbine casing 34. Sharp corners 45 and 46 were formed at the junction of the outer edge 42 with the upper or pressure side 47 and the lower or suction side 48 of the blades, respectively, as as shown in Fig. 4.

The fluid joint 41 thus defined by the outer edges of the runner blades and the wall of the casing, consists of a passage which is substantially similar to the passage 11 previously referred to in the illustration shown in Fig. 1. Consequently cavitation occurs in the fluid joint 41, due to the contraction of the fluid jet in the manner heretofore explained (see Fig. 1), with the result that portions of the runner blades 40 are pitted or corroded, as indicated by the double section lines 49, Fig. 4.

In order to eliminate the cavitation in the fluid joint between the blades of the runner and the wall of the casing, according to my invention the outer edges 42 of the blades are so constructed as to form with the wall of the casing 34, a tapered fluid joint 50, as shown in Fig. 5.

The fluid joint 50 is wider at the inlet than at the outlet, and the inlet corners of the runner blades 40 are rounded off, as indicated at 51.

Obviously, the configuration of the outer edge 42 of the runner blades can be varied from that illustrated to suit other conditions. However, it has been determined by computations and tests that the shape or form imparted to the outer edges 42 in order to produce the tapered fluid joint 50, relative to the vertical direction of flow, should not be less than 3°, as indicated in Fig. 5, and that the radius of curvature of the rounded corners 51 should not be less than $0.35 \times$"$d$", "$d$" representing the vertical distance between the pressure side 47 and the suction side 48 of the blades, as indicated at the right in Fig. 5. In said Fig. "R" indicates the radius of curvature of the corner 51.

By thus constructing a tapered fluid joint between the runner blades and the wall of the turbine casing, as shown in Fig. 5, all particles of the fluid jet inside of the joint are accelerated steadily in such a way that the fluid remains in full flowing contact with the sides of the fluid joint. Furthermore, the decrease in pressure along the walls created by centrifugal forces resulting from the rotation of the runner, will not be accentuated, and therefore the fluid jet will not depart from the walls of the fluid joint 50 and cause cavitation.

In this way a cavitation free fluid joint will be had between the outer edges of the runner blades and the wall of the turbine casing, and pitting or corroding of the runner blades is thus prevented.

It is to be understood that the portions of the impeller blades referred to in the claims are the edges 42 and the corners 51, which edges are located adjacent to the wall of the lower portion 34 of the casing and constitute the outer periphery of the impeller, or rather that portion of the impeller between which a fluid joint is formed with the casing.

Having thus described my invention what I claim is:—

1. The combination with a casing, of an impeller having a plurality of blades, the outer edges of the blades being concentric with the casing wall and inclined at an angle of not less than 3° from the vertical so that the fluid joint between the casing and the outer edges of the blades is tapered.

2. The combination with a casing, of an impeller having a plurality of bandless blades, the upper corners of the outer edges of the blades being curved, the radius of curvature being at least 0.35 × the thickness of the blades at the outer edges thereof.

3. The combination with a casing, of an impeller having a plurality of bandless blades, the outer edges of the blades being inclined at an angle of not less than 3° with respect to the wall of the casing so that the fluid joint between the casing and the outer edges of the blades is tapered, and the upper corners of the blades being curved, the radius of curvature being at least 0.35 × the thickness of the outer edge portion of the blades.

4. The combination with a casing, of an impeller having a plurality of bandless blades, the upper corners of the outer edges of the blades being curved.

5. The combination with a casing, and an impeller having a plurality of bandless blades, the upper corners of the outer edges of the blades being curved, the radius of curvature being at least 0.35 × the thickness of the blades at the outer edges thereof, and the outer edges of the blades below the curved portion being inclined at an angle of at least 3° with the adjacent wall of the casing.

6. An impeller having a plurality of bandless blades, a substantially cylindrical casing surrounding the impeller, and inclined surfaces formed on the outer edge portions of said blades adjacent said casing for forming a cavitation free fluid joint between the impeller and the casing.

7. An impeller having a plurality of bandless blades, a casing surrounding the impeller, and inclined surfaces formed on the outer edge portions of the blades adjacent said casing for forming a fluid joint between the impeller and the casing in which the fluid remains in full flowing contact with the wall of the casing and the periphery of said blades.

8. An impeller having a plurality of bandless blades, a casing surrounding the outer edges of the blades, and inclined surfaces formed on the outer edge portions of the blades adjacent said casing for forming a fluid joint between the impeller and the casing so that at no place can cavitation occur due to departure of the fluid from the sides of the fluid joint.

9. A hydraulic turbine comprising an impeller, a cylindrical casing surrounding the impeller, and inclined surfaces formed on the outer edge portions of the blades of the impeller adjacent said casing for forming a cavitation free fluid joint between the impeller and the casing.

10. The combination with a casing, of an impeller having a plurality of bandless blades, the outer peripheral edges of the blades being rounded.

11. The combination with a casing, of an impeller having a plurality of bandless blades, said blades being formed with peripheral curved portions 51 to provide a cavitation free fluid joint between the outer edges of the impeller blades and the casing.

12. In a device of the class described, the combination with an impeller having a plurality of blades, of a casing surrounding the periphery of the impeller blades, and surfaces formed on the outer edges of said blades to provide a fluid joint between the impeller and the casing which tapers inwardly from the high pressure side towards the lower pressure side of the impeller blades.

13. The combination with a casing, of an impeller having a plurality of bandless blades, the outer peripheral edges of said blades being rounded to provide a fluid joint between the impeller and the casing which is wider at the inlet than at the outlet.

14. The combination with a casing, of an impeller having a plurality of blades, the outer peripheral edges of said blades being inclined with respect to the wall of the casing so as to form a tapered fluid joint between the periphery of the impeller and the casing.

15. The combination with a casing, of an impeller having a plurality of blades, the outer peripheral edges of said blades being curved with respect to the wall of the casing so as to provide a fluid joint between the impeller and the casing which is wider at the inlet than at the outlet.

HANS MUELLER.